March 1, 1966 D. M. ROSENBERG ET AL 3,238,337
THERMOSTATIC SWITCH HAVING PRESS FIT MOTION TRANSLATOR MEMBER
Filed March 5, 1963 2 Sheets-Sheet 2

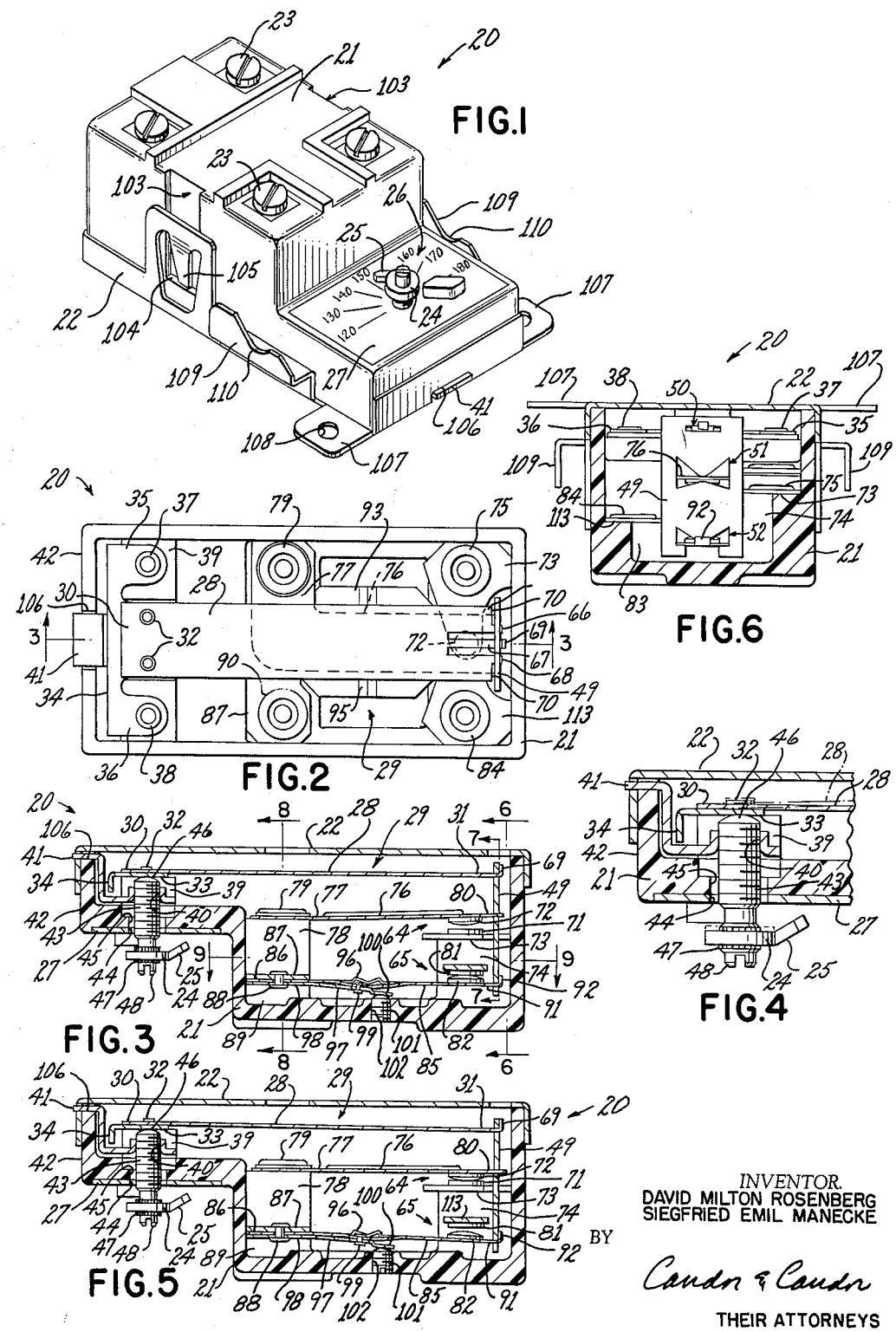

INVENTOR.
DAVID MILTON ROSENBERG
SIEGFRIED EMIL MANECKE
BY
*Cander & Cander*
THEIR ATTORNEYS United States Patent Office 3,238,337
Patented Mar. 1, 1966

3,238,337
THERMOSTATIC SWITCH HAVING PRESS FIT MOTION TRANSLATOR MEMBER
David M. Rosenberg and Siegfried E. Manecke, Indiana, Pa., assignors to Robertshaw Controls Company, Richmond, Va., a corporation of Delaware
Filed Mar. 5, 1963, Ser. No. 263,033
12 Claims. (Cl. 200—138)

This invention relates to an improved thermostat or other control device as well as to improved parts for such a structure or the like.

It is well known to provide a thermostat for controlling the operation of an electrical heater means for a water heater tank or the like, the thermostat including a bimetal member which senses the wall temperature of the tank and controls an electrical switch or the like to selectively energize and deenergize such heating means in accordance with the temperature sensed. By properly selecting the initial position of the bimetal member, the thermostat is adapted to maintain the temperature of the water in the tank at a selected temperature.

Accordingly, it is an object of this invention to provide an improved thermostat or the like of the above described type and which has one or more of the novel features of this invention hereinafter described or illustrated.

Another object of this invention is to provide improved parts for such a thermostat or the like.

Other objects, uses and advantages of this invention are apparent from a reading of this description, which proceeds with reference to the accompanying drawings forming a part thereof and wherein:

FIGURE 1 is a perspective view of the improved thermostat of this invention.

FIGURE 2 is a bottom view of the thermostat illustrated in FIGURE 1 and has the rear cover thereof removed.

FIGURE 3 is an axial cross-sectional view taken on line 3—3 of FIGURE 2.

FIGURE 4 is an enlarged fragmentary view of the temperature selecting means of the thermostat illustrated in FIGURE 3.

FIGURE 5 is a view similar to FIGURE 3 and illustrates the thermostat in another operating position thereof.

FIGURE 6 is a cross-sectional view taken on line 6—6 of FIGURE 3.

Figure 7:
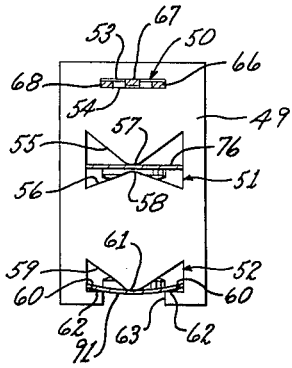
FIGURE 7 is an enlarged cross-sectional view taken on line 7—7 of FIGURE 3 with the background structure removed.

While the various features of this invention are hereinafter described and illustrated as being particularly adaptable to provide a water heater tank thermostat or the like, it is to be understood that the various features of this invention can be utilized singly or in any combination thereof to provide other control devices or the like.

Therefore, this invention is not to be limited to only the embodiments illustrated in the drawings, because the drawings are merely utilized to illustrate one of the wide variety of uses of this invention.

Referring now to FIGURE 1, the improved thermostat or the like of this invention is generally indicated by the reference numeral 20 and comprises a substantially cup-shaped housing 21 formed of suitable insulating material or the like and having the rear or open end thereof closed by a rear cover plate 22 formed of metal or the like.

The housing 21 is provided with a plurality of input and output terminal posts 23 for respectively interconnecting the thermostat 20 to a power source and to the heater means or other electrical devices of a water heater tank or the like, the terminal posts 23 comprising conventional threaded screw-like members.

The thermostat 20 is so constructed and arranged in a manner hereinafter described that the same is adapted to automatically maintain the temperature of the water in a water heater tank at a temperature selected by the manual setting of a rotatable indicating knob 24 carried by the housing 21 in a manner hereinafter described, whereby the pointer 25 of the knob 24 will indicate proper temperature setting as provided by the scale 26 carried on a plate 27 secured to the housing 21 in any suitable manner.

The particular details of the thermostat 20 will now be described and reference is made to FIGURES 2 and 3 wherein a substantially flat bimetal member 28 is disposed in the cavity 29 of the housing 21 and has opposed ends 30 and 31.

The end 30 of the bimetal member 28 is secured by rivets 32 or the like to the middle leg 33 of a plural leg member 34 having its outer legs 35 and 36 respectively secured to the housing 21 by rivets 37 and 38 or the like. The middle leg 33 of the plural leg member 34 forms a leaf spring-like member that normally tends to move downwardly toward the housing 21 in FIGURE 3 and carry the end 30 of the bimetal member 28 therewith.

A calibration screw plate 39 is disposed in the housing 21 below the plural leg member 34 and is secured to the housing 21 by the previously described rivets 37 and 38, the calibration screw plate 39 having a threaded aperture 40 passing substantially centrally therethrough and having an end flange 41 projecting outwardly beyond the wall 42 of the housing 21.

A calibration screw or externally threaded adjusting member 43 passes through aligned apertures 44 and 45 in the plate 27 and housing 21 to be threadedly received in the threaded aperture 40 of the calibration screw plate 39 as illustrated in FIGURE 3, whereby the free end 46 of the calibration screw 43 engages the leaf spring 33 to limit movement thereof toward the housing 21.

The selector knob 24 is press fitted on a knurled portion 47 of the calibration screw 43 at a point outside the housing 21, whereby the indicating pointer 25 thereof is adapted to be moved across the dial face 26 in unison with rotation of the calibration screw 43, the calibration screw 43 being adapted to be rotated relative to the housing 21 by inserting a screw driver or the like in the bifurcated end 48 thereof.

In this manner, the end 30 of the bimetal member 28 is adapted to be raised and lowered in FIGURE 3 by movement of the calibration screw 43 in and out of the housing 21, whereby as the end 30 of the bimetal member 28 is moved upwardly a higher temperature setting is provided for the thermostat 20. Conversely, downward movement of the end 30 of the bi-metal member 28 in FIGURE 3 provides a lower temperature setting for the thermostat 20.

A movable lever tie bar 49 is disposed in the housing 21 and is formed of suitable insulating material or the like, the lever 49 having a plurality of slot means 50, 51, and 52 passing therethrough in the manner illustrated in FIGURE 7. The slot means 50 of the lever 49 is defined in part by opposed surface means 53 and 54, which are substantially straight and parallel to each other while the slot means 51 is defined between opposed surfaces 55 and 56 respectively defining substantially triangular portions having the apexes 57 and 58 thereof facing each other and disposed apart a desired distance for a purpose hereinafter described. The slot means 52 of the lever 49 is defined between opposed surface means 59 and 60, the opposed surface 59 defining a substantially triangular portion having an apex 61 disposed substantially intermediate the spaced straight portions 62 of the opposed surface means 60. The portions 62 of the lever 49 are separated from each other by a recess 63 which intersects the slot means 52 for a purpose hereinafter described.

The movable end 31 of the bimetal member 28 is operatively interconnected to the lever 49 to cause vertical movement of the lever 49 in FIGURE 3 and, thus, to control the operation of a pair of electrical switches 64 and 65 disposed in the housing 21.

In particular, the movable end 31 of the bimetal member 28 is divided into three legs 66, 67, and 68, with the middle leg 67 being bent out of the plane of the outer legs 66 and 68. In this manner, the legs 66-68 of the free end 31 of the bi-metal member 28 can be press fitted through the slot means 50 of the lever 49, whereby the legs 66-68 are placed under compression between the opposed surfaces 53 and 54 of the slot means 50 in the manner illustrated in FIGURE 7.

This press fit interconnection of the free end 31 of the bimetal member 28 to the lever 49 prevents any lost motion between the free end 31 of the bimetal member 28 and the lever 49.

The free end 69 of the middle leg 67 of the bimetal member 28 can be bent transversely in the manner illustrated in FIGURE 3 to prevent the lever 49 from moving to the right relative to the bimetal member 28 while movement of the lever 49 to the left relative to the bimetal member 28 is prevented by shoulders 70 of the bimetal member 28.

The electrical switch 64 comprises a fixed contact 71 and a cooperable and movable contact 72, the fixed contact 71 being carried on a conductive plate 73 secured to a post 74 of the housing 21 by a conductive rivet 75 interconnected to one of the terminal posts 23.

The movable contact 72 is carried by a resilient switch blade 76 having one end 77 thereof secured to a post 78 of the housing 21 by a conductive rivet 79 interconnected to one of the terminal posts 23. The other end 80 of the resilient switch blade 76 passes through the slot means 51 of the lever 49 and is normally biased against the apex 57 of the surface means 55 of the lever 49, regardless of the position of the lever 49 relative to the housing 21.

As illustrated in FIGURE 7, the end 80 of the switch blade 76, when disposed against the apex 57 of the surface means 55 of the lever 49, is normally spaced from the apex 58 of the surface means 56 thereof a distance of approximately 0.012 of an inch for a purpose hereinafter described.

Thus, it can be seen that when the movable end 31 of the bimetal member 28 moves downwardly from the position illustrated in FIGURE 3 to the position illustrated in FIGURE 5 upon the bimetal member 28 sensing an increase in temperature value, the lever 49 causes the movable contact 72 to move into electrical contact with the fixed contact 71.

The electrical switch 65 comprises a fixed contact 81 and a movable contact 82 cooperable with the fixed contact 81, the fixed contact 81 being carried on a conductive plate 113 secured to a post 83 of the housing 21 by a conductive rivet 84 interconnected to one of the terminal posts 23.

Figure 8:
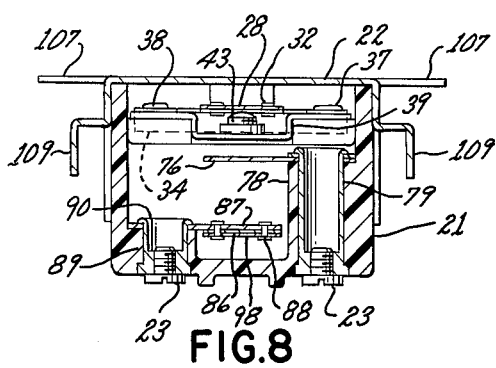
FIGURE 8 is a cross-sectional view taken on line 8—8 of FIGURE 3.

The movable contact 82 is carried by a switch blade 85 having one end 86 thereof secured to a conductive plate 87 by rivets 88 or the like, the conductive plate 87 being secured to a post 89 of the housing 21 by a conductive rivet 90 interconnected to one of the terminal posts 23 in the manner illustrated in FIGURE 8.

The other end 91 of the switch blade 85 passes through the slot means 52 of the lever 49 in such a manner that the end 91 of the switch blade 85 is compressed between the opposed surface means 59 and 60 of the lever 49 to prevent any lost motion between the lever 49 and the switch blade 85.

For example, reference is made to FIGURE 7 wherein it can be seen that the portions 61 and 62 of the slot means 52 are so constructed and arranged that the same slightly bow the switch blade 85 as the switch blade 85 passes through the slot means 52 to place the same under compression in the slot means 52 and, thereby, prevent any lost motion between the switch blade 85 and the lever 49.

A leg 92 extends outwardly from the end 91 of the switch blade 85 and is bent transversely relative thereto to prevent outward movement of the lever 49 relative to the switch blade 85.

Figure 9:
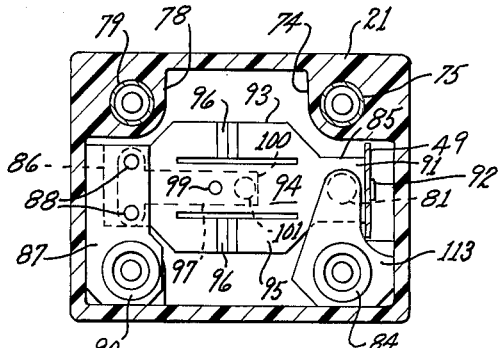
FIGURE 9 is a cross-sectional view taken on line 9—9 of FIGURE 3.

As illustrated in FIGURE 9, the switch blade 85 is divided into three legs 93, 94 and 95 intermediate its ends 86 and 91. The outer legs 93 and 95 are suitably crimped at 96 in the manner illustrated in FIGURES 3 and 9 to place the middle leg 94 under compression whereby the switch blade 85 is rendered snap-acting for a purpose hereinafter described.

A leaf spring 97 is disposed in the housing 21 and has one end 98 thereof secured to the conductive plate 87 by the same rivets 88 that secure the switch blade 85 to the conductive plate 87.

The leaf spring 97 is interconnected to the middle leg 94 of the switch blade 85 by a rivet 99 and normally tends to move downwardly toward the housing 21 in the manner illustrated in FIGURE 3 to aid the snap-acting function of switch blade 85.

The free end 100 of the leaf spring 97 is engaged by a threaded adjusting member 101 threadedly disposed in an internally threaded bore 102 formed in the housing 21, the adjusting member 101 being adapted to limit downward movement of the leaf spring 97 in FIGURE 3 to provide a means for establishing the desired snap point of the switch blade 85.

Therefore, it can be seen that as the movable end 31 of the bimetal member 28 tends to move downwardly in FIGURE 3 upon an increase in sensed temperature value, the lever 49 also tends to move downwardly therewith and imposes a downward force on the switch blade 85. When a sufficient downward force is imposed on the switch blade 85 by the lever 49, the switch blade 85 snaps downwardly in the manner illustrated in FIGURE 5 whereby the electrical contact between the contacts 81 and 82 is abruptly terminated while the contacts 72 and 71 are brought into electrical contact with each other.

Conversely, when the movable end 31 of the bimetal member 28 tends to move upwardly upon a decrease in sensed temperature value, the switch blade 85 subsequently snaps over center when a sufficient force has been applied thereto by the lever 49 tending to pull the same upwardly whereby the contact 82 is snapped into electrical engagement with the contact 81 while the contacts 72 and 71 are snapped open in the manner illustrated in FIGURE 3.

The rear cover 22 of the thermostat 20 is substantially cup-shaped to telescopically receive the rear of the housing 21 in the manner illustrated in FIGURE 3, the housing 21 having a pair of opposed recesses 103 formed therein and terminating in shoulders 104 as illustrated in FIGURE 1.

The rear cover 22 has a pair of inwardly biased tangs 105 which are adapted to snap into the recesses 103 when the cover 22 and housing 21 are telescoped together whereby the ends of the tangs 105 of the cover 22 catch against the shoulders 104 to secure the cover 22 to the housing 21.

In addition, the cover 22 has a slot 106 passing therethrough to snap fittingly receive the flange 41 of the calibration screw plate 39 in the manner illustrated in FIGURES 1 and 3 whereby not only does the calibration screw plate 39 provide an anchor for the back cover 22, but also the calibration screw plate 39 acts as a conductor to pick up and transfer surface temperature to the bimetal member 28.

If desired, the cover 22 can have a pair of outwardly directed ears or lugs 107 in the manner illustrated in FIGURE 1 whereby the thermostat 20 can be secured to the desired surface by suitable fastening members passing through apertures 108 in the lugs 107.

Alternately, or additionally, the back cover 22 can be provided with ears 109, FIGURE 1, which provide means for mounting the thermostat 20 to a suitable appliance by the use of spring brackets which snap down on the ears 109 at the points 110.

The operation of the thermostat 20 of this invention will now be described.

After the thermostat 20 has been mounted to the water heater tank or the like and the power source lines and heater means or other electrical devices have been appropriately interconnected to the terminal posts 23 thereof, the operator sets the pointer 25 to the desired temperature, such as 150° F. as illustrated in FIGURE 1 whereby the end 46 of the calibration screw 43 properly positions the end 30 of the bimetal member 28 relative to the housing 21.

Assuming that the temperature being sensed by the bimetal member 28 is below the temperature that would cause the thermostat 20 to turn off the heater means of the water heater tank, the switches 64 and 65 are disposed in the position illustrated in FIGURE 3 whereby suitable electrical current is directed to the heater means of the water heater tank.

However, as the temperature of the water in the water heater tank increases to the selected temperatures, the movable end 31 of the bimetal member 28 tends to move downwardly from the position illustrated in FIGURE 3 until the same exerts sufficient downward force on the lever 49 to cause the switch blade 85 to snap downwardly to the position illustrated in FIGURE 5 whereby the contacts 81 and 82 are snapped open while the contacts 72 and 71 are snapped closed so that the heating means for the water heater tank is deenergized as the temperature of the water in the tank is at the selected temperature value.

With the thermostat 20 disposed in the position illustrated in FIGURE 5 and the temperature of the water in the water tank decreasing below the selected temperature, the end 31 of the bimetal member 28 tends to move upwardly from the position illustrated in FIGURE 5 until the same exerts sufficient force to cause the switch blade 85 to snap in an upward direction to snap close the contacts 81 and 82 and to snap open the contacts 71 and 72 to again energize the heating means of the water heater tank.

During this last operation, it may be that the contacts 71 and 72 had become stuck in their closed position while the lever 49 is being snapped upwardly. However, it can be seen from FIGURE 7 that the lever 49 can move relative to the switch blade 76 before the apex 58 of the lower surface means 56 thereof comes into contact with the switch blade 76 whereby the lever 49 can apply a hammer blow to the switch blade 76 to unstick the contacts 71 and 72 should the same become stuck during operation of the thermostat 20.

Thus, it can be seen that the thermostat 29 can cycle in such a manner to maintain the temperature value of the water in the water heater tank at the selected temperature value.

Therefore, it can be seen that an improved thermostat or the like is provided by this invention as well as improved parts for such a thermostat or the like.

Figure 10:
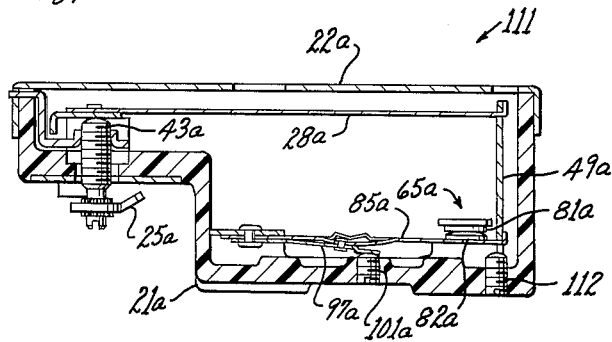
FIGURE 10 is a view similar to FIGURE 3 and illustrates another embodiment of this invention.

While the thermostat 20 previously described has been illustrated as a single pole double throw unit, it is to be understood that the same can be constructed in a like manner to form a single pole single throw unit by simply eliminating the fixed contact 71 and switch blade 76 in the manner illustrated in FIGURE 10 whereby another thermostat of this invention is generally indicated by the reference numeral 111 and parts thereof similar to the thermostat 20 previously described or indicated by like reference numerals followed by the reference letter "a."

As illustrated in FIGURE 10, the fixed contact 71 and switch blade 76 have been eliminated whereby the lever 49a merely controls the operation of the electrical switch 65a in the manner previously described.

However, when the lever 49 of the thermostat 20 was snapped downwardly from the position illustrated in FIGURE 3 to the position illustrated in FIGURE 5, the engagement between the contacts 71 and 72 thereof limited the downward movement of the lever 49 upon the snap-action of the switch blade 85.

Therefore, in order to limit the downward movement of the lever 49a of the thermostat 111 illustrated in FIGURE 10, an adjusting screw 112 is adjustably carried by the housing 21a to limit downward movement of the lever 49a after the contacts 81a and 82a have been snapped open in the manner previously described, the adjusting screw 112 being engageable by the end of the lever 49a.

Therefore, it can be seen that the thermostat of this invention can be modified in any desired manner while still performing the desired functions of this invention.

While the form of the invention now preferred has been disclosed as required by the statutes, other forms may be used, all coming within the scope of the claims which follow.

What is claimed is:

1. A thermostat or the like comprising a housing, a leaf spring carried by said housing and tending to move in one direction, a member adjustably carried by said housing and limiting the movement of said leaf spring in said one direction, a bimetal member disposed in said housing and having opposed ends, one of said ends of said bimetal member being secured to said leaf spring to follow the movement thereof, the other end of said bimetal member having a plurality of legs, at least one of said legs being disposed out of the plane of the other legs, a flat insulating tie bar disposed in said housing and having a plurality of slot means passing therethrough and respectively defined by opposed surfaces, said legs of said bimetal member being press fitted in one of said slot means of said tie bar whereby said legs are under compression between said opposed surfaces of said one slot means and said other end of said bimetal member is interconnected to said tie bar without any lost motion therebetween, a pair of fixed contacts disposed in said housing, a pair of resilient switch blades disposed in said housing and respectively having one of the ends thereof secured to said housing, the other ends of said blades carrying contacts respectively cooperable with said fixed contacts, said other end of one of said blades passing through a slot means of said tie bar and normally engaging one of said surfaces thereof while being spaced from the other surface thereof, the other switch blade having the other end thereof disposed in a slot means of said tie bar and being under compression between the opposed surfaces thereof to prevent any lost motion between said other blade and said tie bar, said other blade being divided into three legs intermediate the ends thereof with the outer two legs being crimped to place the middle leg under compression whereby said other switch blade is snap-acting, a spring blade having one end secured to said housing and normally tending to move the other end thereof in one direction, said spring blade being interconnected to said middle leg of said other switch blade, and an element adjustably carried by said housing to limit movement of said spring blade in said one direction.

2. A thermostat or the like comprising a housing, a leaf spring carried by said housing and tending to move in one direction, a member adjustably carried by said housing and limiting the movement of said leaf spring in said one direction, a bimetal member disposed in said housing and having opposed ends, one of said ends of said bimetal member being secured to said leaf spring to follow movement thereof, the other end of said bimetal member having a plurality of legs, at least one of said legs being disposed out of the plane of the other legs, a tie bar disposed in said housing and having a slot passing therethrough and defined by opposed surfaces, said legs of said bimetal member being press fitted in said slot of said tie bar whereby said legs are under compression between said opposed surfaces of said slot and said other end of said bimetal member is interconnected to said tie bar without any lost motion therebetween, a fixed contact carried by said housing, and a movable contact carried by said housing and cooperable with said fixed contact, said movable contact being operatively interconnected to said tie bar.

3. A thermostat or the like comprising a housing, a leaf spring carried by said housing and tending to move in one direction, an adjusting member threadedly carried by said housing and engaging said leaf spring to limit the movement of said leaf spring in said one direction, a bimetal member disposed in said housing and having opposed ends, one of said ends of said bimetal member being secured to said leaf spring to follow movement thereof, said leaf spring including a plural leg member having the intermediate leg secured to said one end of said bimetal member and the other leg secured to said housing and control means carried by said housing and being operatively interconnected to the other end of said bimetal member whereby said control means is operated by movement of said other end of said bimetal member.

4. A thermostat or the like comprising a housing, a bimetal member disposed in said housing and having a movable end, said movable end being divided into a plurality of legs, at least one of the legs being disposed out of the plane of the other legs, a tie bar disposed in said housing and having a slot passing therethrough and defined by opposed surfaces, said legs of said bimetal member being press fitted in said slot of said tie bar whereby said legs are under compression between said opposed surfaces of said slot and said movable end of said bimetal member is interconnected to said tie bar without any lost motion therebetween, and control means carried by said housing and being operatively interconnected to said tie bar whereby said control means is operated by movement of said movable end of said bimetal member.

5. A thermostat or the like comprising a housing, a bimetal member disposed in said housing and having a movable end, and a movable tie bar disposed in said housing and having a slot passing therethrough, said movable end of said bimetal member being press fitted in said slot to interconnect said bimetal member to said tie bar without any lost motion therebetween.

6. A thermostat or the like comprising a housing, a movable tie bar carried by said housing and having a slot passing therethrough and defined by opposed surfaces, a fixed contact carried by said housing, a spring blade carried by said housing and having a contact cooperable with said fixed contact, said spring blade passing through said slot and normally engaging one of said surfaces of said tie bar when said contacts are opened or closed, said spring blade normally being spaced from the other surface of said tie bar, and means for moving said tie bar in a direction to open said contacts whereby said other surface of said tie bar can hammer against said spring blade to open said contacts should said contacts stick in the closed position thereof.

7. A thermostat or the like comprising a housing, a movable tie bar carried by said housing and having a slot passing therethrough and defined by opposed surface means, a fixed contact carried by said housing, and a spring blade carried by said housing and having a contact cooperable with said fixed contact, said spring blade passing through said slot and being compressed between said opposed surface means to prevent any lost motion between said spring blade and said tie bar, said slot of said tie bar bowing said spring blade.

8. In a control device or the like, a housing, a movable tie bar carried by said housing and having a slot passing therethrough and defined by opposed surface means, and a spring blade carried by said housing and passing through said slot in said tie bar, said spring blade being compressed between said opposed surface means of said tie bar to prevent any lost motion between said spring blade and said tie bar.

9. In a control device or the like as set forth in claim 8, one of said opposed surface means defining a portion disposed between a pair of portions of said other surface means whereby said spring blade engages said portions and is bowed thereby.

10. In a control device or the like as set forth in claim 9, said portion of said one surface means is substantially pointed while said portions of said other surface means are substantially straight and disposed in the same plane.

11. A thermostat or the like comprising a housing, a movable tie bar carried by said housing, a fixed contact carried by said housing, and a spring blade carried by said housing and having a contact cooperable with said fixed contact, said spring blade being operatively interconnected to said tie bar and being divided into three legs intermediate the ends thereof, the outer legs being crimped to place the middle leg under compression whereby said spring blade is snap-acting, and a leaf spring carried by said housing and secured to said middle leg of said spring blade to tend to move said spring blade in one direction.

12. A tie bar for a thermostat or the like and having slot means passing therethrough to receive a portion of a movable member of said thermostat or the like, said slot means being defined between opposed surfaces, said opposed surfaces being so constructed and arranged that the same are adapted to place the portion of said movable member under compression to prevent any lost motion between said tie bar and said movable member, one of said opposed surfaces being divided into two spaced portions and the other opposed surface having a portion disposed between said portions of said one surface whereby said portion of said movable member will be bowed between said portions of said tie bar.

References Cited by the Examiner

UNITED STATES PATENTS

| 2,189,627 | 2/1940 | Clark | 200—138 |
| 2,427,944 | 9/1947 | Clark | 200—138 |
| 2,665,353 | 1/1954 | Popp | 200—168 |
| 2,665,354 | 1/1954 | Popp | 200—168 |
| 2,689,290 | 9/1954 | Mertler | 200—138 |
| 2,823,283 | 2/1958 | Malone | 200—138 |
| 2,824,193 | 2/1958 | Rosen et al. | 200—138 |
| 3,101,397 | 10/1963 | Norden | 200—138 |

OTHER REFERENCES 1,077,333, Mar. 10, 1960, German application.

BERNARD A. GILHEANY, *Primary Examiner.*

ROBERT K. SCHAEFER, *Examiner.*